United States Patent
Ikemoto et al.

(10) Patent No.: US 11,082,819 B2
(45) Date of Patent: Aug. 3, 2021

(54) MOBILITY SERVICE SUPPORTING DEVICE, MOBILITY SYSTEM, MOBILITY SERVICE SUPPORTING METHOD, AND COMPUTER PROGRAM FOR SUPPORTING MOBILITY SERVICE

(71) Applicant: TOYOTA JIDOSHA KABUSHIKI KAISHA, Toyota (JP)

(72) Inventors: Koichi Ikemoto, Nagoya (JP); Keiji Yamashita, Nisshin (JP); Koji Taguchi, Sagamihara (JP); Shin Sakurada, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/654,363

(22) Filed: Oct. 16, 2019

(65) Prior Publication Data
US 2020/0145800 A1 May 7, 2020

(30) Foreign Application Priority Data

Nov. 7, 2018 (JP) .............................. JP2018-209881

(51) Int. Cl.
*H04W 4/48* (2018.01)
*H04W 4/12* (2009.01)
*G06Q 10/08* (2012.01)
*G01C 21/26* (2006.01)
*H04W 4/029* (2018.01)

(52) U.S. Cl.
CPC .............. *H04W 4/48* (2018.02); *G01C 21/26* (2013.01); *G06Q 10/08355* (2013.01); *H04W 4/029* (2018.02); *H04W 4/12* (2013.01)

(58) Field of Classification Search
CPC ...... H04B 1/3822; H04W 4/48; H04W 4/029; H04W 4/12; G01C 21/26; G06Q 10/08355
USPC ................................ 455/96, 456.3
See application file for complete search history.

(56) References Cited

U.S. PATENT DOCUMENTS

| | | | |
|---|---|---|---|
| 10,303,961 B1 * | 5/2019 | Stoffel | B60Q 3/76 |
| 2015/0116103 A1 * | 4/2015 | Yang | G08B 1/08 |
| | | | 340/438 |
| 2017/0175431 A1 * | 6/2017 | Bradley | G06Q 10/083 |
| 2020/0066135 A1 * | 2/2020 | Barrera | B60N 2/002 |

FOREIGN PATENT DOCUMENTS

JP 2009-075756 A 4/2009

\* cited by examiner

*Primary Examiner* — Charles N Appiah
*Assistant Examiner* — Frank E Donado
(74) *Attorney, Agent, or Firm* — Sughrue Mion, PLLC

(57) ABSTRACT

A mobility service supporting device includes a communication unit configured to be communicable with a vehicle-mounted device installed in a vehicle subjected to autonomous driving control and a portable terminal of a user of the vehicle and a controller configured to transmit, based on information about the position of the vehicle which is received from the vehicle-mounted device via the communication unit, notification for preventing the portable terminal from being left behind in the vehicle to the portable terminal of the user via the communication unit before the vehicle arrives at a destination of the user.

16 Claims, 6 Drawing Sheets

MOBILITY SERVICE SUPPORTING DEVICE, MOBILITY SYSTEM, MOBILITY SERVICE SUPPORTING METHOD, AND COMPUTER PROGRAM FOR SUPPORTING MOBILITY SERVICE

INCORPORATION BY REFERENCE

The disclosure of Japanese Patent Application No. 2018-209881 filed on Nov. 7, 2018 including the specification, drawings and abstract is incorporated herein by reference in its entirety.

BACKGROUND

1. Technical Field

The disclosure relates to a mobility service supporting device, a mobility system, a mobility service supporting method, and a computer program for supporting a mobility service.

2. Description of Related Art

Japanese Unexamined Patent Application Publication No. 2009-75756 (JP 2009-75756 A) discloses an in-vehicle article-left-behind prevention device. The in-vehicle article-left-behind prevention device detects an article left behind in a vehicle by comparing an image of the inside of the vehicle captured by a camera and a reference image with each other and in a case where the article left behind in the vehicle is detected, the in-vehicle article-left-behind prevention device notifies a user of the vehicle that there is an article left behind by using a speaker or a display in the vehicle or transmitting a mail to a cellular phone of the user while a door of the vehicle is open.

SUMMARY

In recent years, autonomous driving technologies have been developed to realize a mobility service such as a taxi service, a bus service, and a ridesharing service which use an autonomous vehicle which is autonomously controlled and driven. The autonomous vehicle has a merit that the autonomous vehicle does not need a crew such as a driver but has a problem that the autonomous vehicle cannot detect an article left behind and notifies a user of the article even when the user gets off the vehicle with an article left behind in the vehicle, for example.

Accordingly, it is conceivable to attach the in-vehicle article-left-behind prevention device as described in JP 2009-75756 A to the autonomous vehicle, for example. However, in a case where a user gets off the vehicle in a hurry, the user may not notice notification about an article left behind even if the notification is performed while a door of the vehicle is open. Especially, in a case where the article left behind is a portable terminal, since the notification about the article left behind is performed with respect to the portable terminal left in the vehicle, the user is not likely to notice the notification.

In this case, if the article left behind in the vehicle is an article other than a portable terminal of the user, it is possible to notify the user of the article left behind in the vehicle even after the user gets off the vehicle by performing notification about the article left behind with respect to the portable terminal of the user separately. However, in a case where the article left behind in the vehicle is a portable terminal, it is not possible to notify the user of the article left behind in the vehicle even by performing notification about the article left behind with respect to the portable terminal separately.

The disclosure provides a mobility service supporting device, a mobility system, a mobility service supporting method, and a computer program for supporting a mobility service with which it is possible to suppress a portable terminal being left behind in a vehicle.

A first aspect of the disclosure relates to a mobility service supporting device including a communication unit and a controller. The communication unit is configured to be communicable with a vehicle-mounted device installed in a vehicle subjected to autonomous driving control and a portable terminal of a user of the vehicle. The controller is configured to transmit, based on information about the position of the vehicle which is received from the vehicle-mounted device via the communication unit, notification for preventing the portable terminal from being left behind in the vehicle to the portable terminal of the user via the communication unit before the vehicle arrives at a destination of the user.

A second aspect of the disclosure relates to a mobility system including a vehicle-mounted device, a portable terminal, and a server. The vehicle-mounted device is installed in a vehicle subjected to autonomous driving control. The portable terminal is a portable terminal of a user of the vehicle. The server is connected to be communicable with the vehicle-mounted device and the portable terminal via a network. The vehicle-mounted device transmits information about the position of the vehicle to the server. The server transmits, based on the information about the position of the vehicle, notification for preventing the portable terminal from being left behind in the vehicle to the portable terminal of the user before the vehicle arrives at a destination of the user.

A third aspect of the disclosure relates to a mobility service supporting method including transmitting, based on information about the position of a vehicle subjected to autonomous driving control which is received from a vehicle-mounted device installed in the vehicle via a communication unit configured to be communicable with the vehicle-mounted device and a portable terminal of a user of the vehicle, notification for preventing the portable terminal from being left behind in the vehicle to the portable terminal of the user via the communication unit before the vehicle arrives at a destination of the user.

A fourth aspect of the disclosure relates to a computer program for supporting a mobility service, the program causing a computer to transmit, based on information about the position of a vehicle subjected to autonomous driving control which is received from a vehicle-mounted device installed in the vehicle via a communication unit configured to be communicable with the vehicle-mounted device and a portable terminal of a user of the vehicle, notification for preventing the portable terminal from being left behind in the vehicle to the portable terminal of the user via the communication unit before the vehicle arrives at a destination of the user.

According to the aspects of the disclosure, it is possible to suppress a portable terminal being left behind in a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
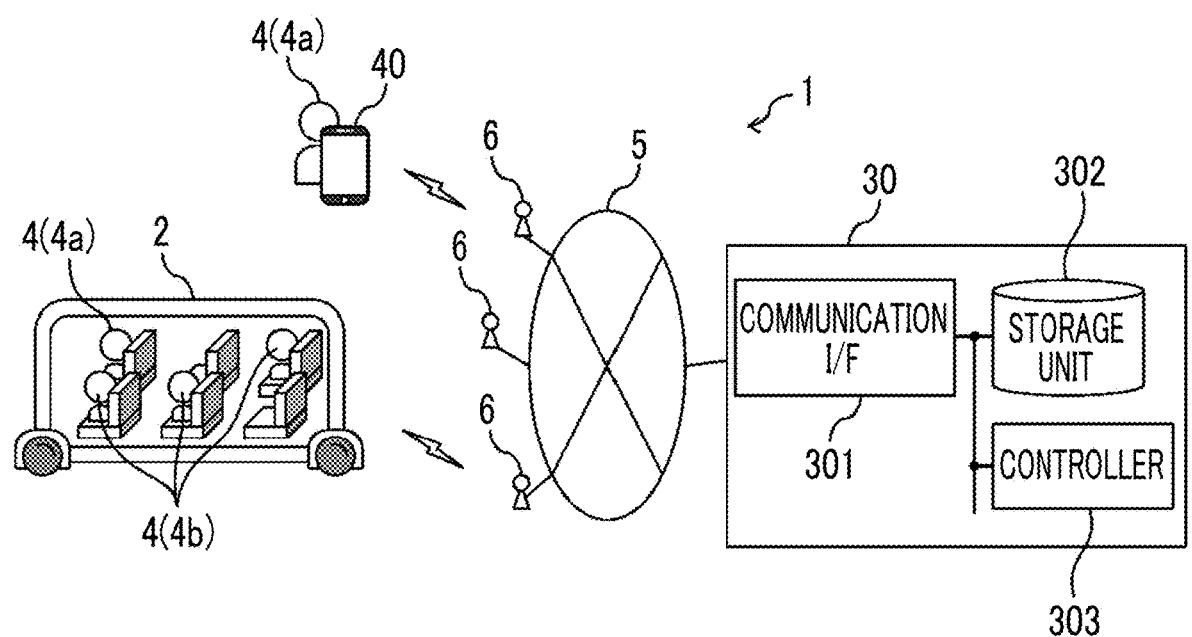
FIG. 1 is a diagram illustrating an example of the configuration of a mobility system according to an embodiment of the disclosure.

Hereinafter, an embodiment of the disclosure will be described with reference to drawings. Note that, in the following description, the same constituent elements are given the same reference numerals.

FIG. 1 is a diagram illustrating an example of the configuration of a mobility system 1 according to the embodiment of the disclosure.

The mobility system 1 according to the present embodiment is provided with a vehicle-mounted device 20 (refer to FIG. 2) installed in a vehicle 2, a server 30, and a portable terminal 40. The vehicle-mounted device 20, the server 30, and the portable terminal 40 can communicate with each other via a network 5 including an optical communication line or the like. The server 30 is connected to the network 5 via a gateway (not shown) or the like, for example. In addition, the vehicle-mounted device 20 and the portable terminal 40 are connected to the network 5 via a wireless base station 6 or the like, for example. The server 30 is an example of a mobility service supporting device for improvement of a mobility service.

The vehicle 2 shown in FIG. 1 is an autonomous vehicle that provides a mobility service such as a taxi service, a bus service, or a ridesharing service. A user 4 using the mobility service gets on the vehicle 2. Each user 4 carries the portable terminal 40 such as a cellular phone or a tablet computer.

Figure 2:
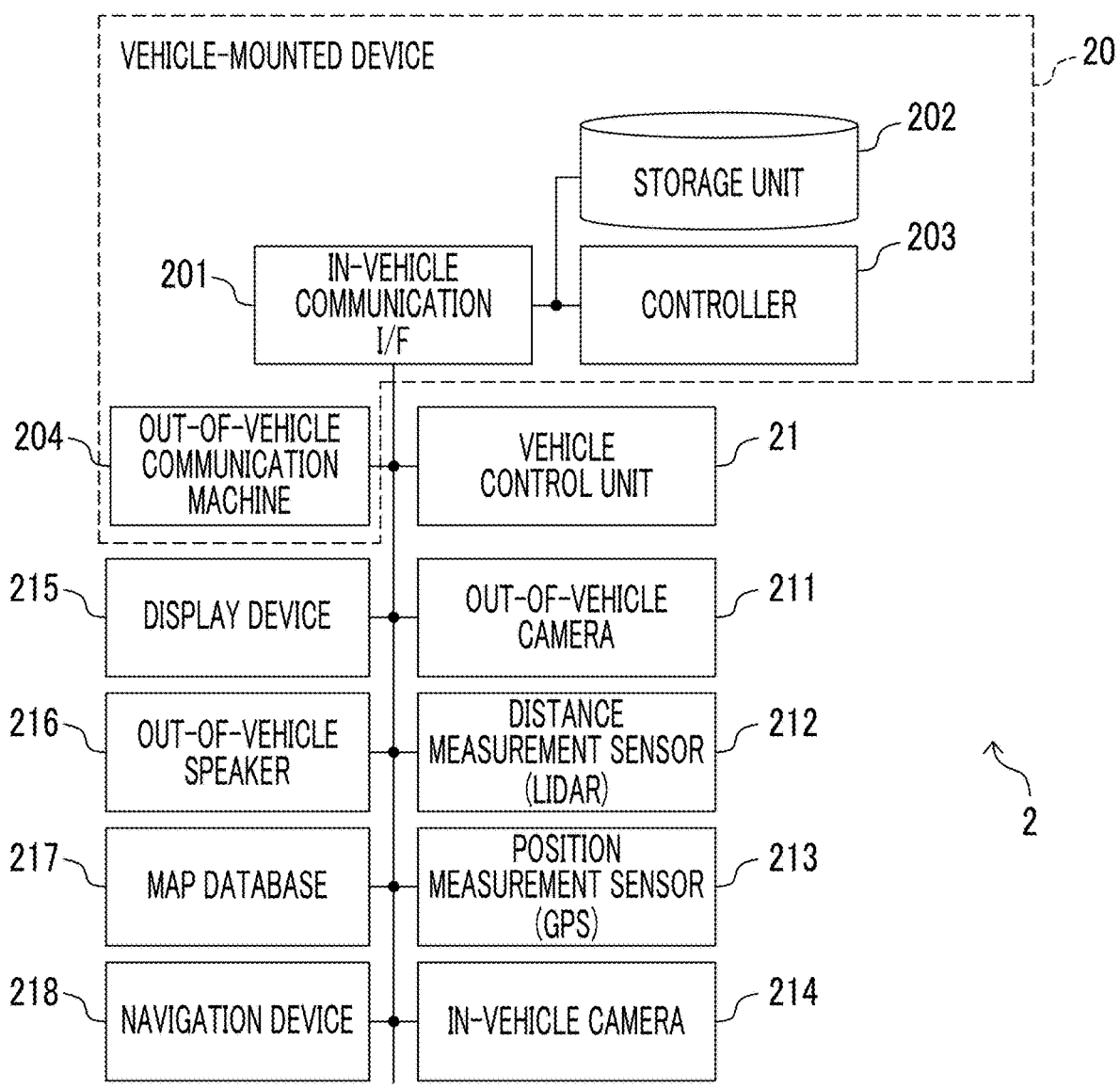
FIG. 2 is a hardware configuration diagram of a vehicle according to the embodiment of the disclosure.

FIG. 2 is a hardware configuration diagram of the vehicle 2.

As shown in FIG. 2, the vehicle 2 is provided with the vehicle-mounted device 20, a vehicle control unit 21, an out-of-vehicle camera 211, a distance measurement sensor 212, a position measurement sensor 213, an in-vehicle camera 214, a display device 215, an out-of-vehicle speaker 216, a map database 217, and a navigation device 218 which are connected to each other via an in-vehicle network 3. The in-vehicle network 3 is, for example, a network conforming to a controller area network (CAN) standard.

The vehicle-mounted device 20 is provided with an in-vehicle communication interface (hereinafter, referred to as in-vehicle communication I/F) 201, a storage unit 202, and a controller 203 which are connected to each other via a signal line. In addition, the vehicle-mounted device 20 is provided with an out-of-vehicle communication machine 204 that is connected to the in-vehicle communication I/F 201 via the in-vehicle network 3.

The in-vehicle communication I/F 201 is a communication I/F circuit used for the vehicle-mounted device 20 to communicate with the out-of-vehicle communication machine 204 and other in-vehicle machines of the vehicle 2 via the in-vehicle network 3.

The storage unit 202 includes a storage medium such as a hard disk drive (HDD), an optical recording medium, and a semiconductor memory and stores a computer program executed in the controller 203. In addition, the storage unit 202 stores data generated by the controller 203 and data that the controller 203 receives from the out-of-vehicle communication machine 204 or other in-vehicle machines of the vehicle 2 via the in-vehicle network 3.

The controller 203 may be one or more processors executing a computer program for control and calculation performed in the vehicle-mounted device 20 and a circuit in the vicinity of the one or more processors.

The out-of-vehicle communication machine 204 is an in-vehicle terminal that has a wireless communication function. The out-of-vehicle communication machine 204 is connected to the network 5 via the wireless base station 6 by accessing the wireless base station 6, which is connected to the network 5 via a gateway (not shown) or the like, for example. Accordingly, the vehicle-mounted device 20 and the server 30 communicate with each other. In addition, the out-of-vehicle communication machine 204 is configured such that the vehicle-mounted device 20 and the portable terminal 40 of a user 4 can communicate with each other by using short-range wireless communication such as Wi-Fi (registered trademark) or Bluetooth (registered trademark).

The vehicle control unit 21 performs a driving operation related to acceleration, steering, and braking based on signals output from the out-of-vehicle camera 211, the distance measurement sensor 212, the position measurement sensor 213, the in-vehicle camera 214, and the like such that the vehicle 2 autonomously travels along a traveling route created by the navigation device 218.

The out-of-vehicle camera 211 captures a video of the vicinity of the vehicle 2 and outputs the video. The video captured by the out-of-vehicle camera 211 is used for the vehicle control unit 21 to autonomously control the driving of the vehicle 2. The out-of-vehicle camera 211 is disposed close to a windshield of the vehicle 2 with an imaging surface facing the outside of the vehicle such that an object and a person in the vicinity of the vehicle 2 are clearly imaged, for example.

The distance measurement sensor 212 measures a distance to an object present in the vicinity of the vehicle 2 for each cardinal direction and outputs the distance. Similarly, information about the distance measured by the distance measurement sensor 212 is used for the vehicle control unit 21 to autonomously control the driving of the vehicle 2. The distance measurement sensor 212 is, for example, a light detection and ranging (LIDAR) device installed in the vehicle 2.

The position measurement sensor 213 generates current position information indicating the current location of the vehicle 2 and outputs the current position information. The current position information of the vehicle 2 which is generated by the position measurement sensor 213 is used for the vehicle control unit 21 to autonomously control the driving of the vehicle 2 and is transmitted to the server 30 from the vehicle-mounted device 20 (more specifically, out-of-vehicle communication machine 204) via the network 5 such that the server 30 can grasp the current position of the vehicle 2. The position measurement sensor 213 is, for example, a global positioning system (GPS) installed in the vehicle 2.

The in-vehicle camera 214 captures a video of the inside of the vehicle and outputs the video to the vehicle-mounted device 20 and the vehicle control unit 21. The video captured by the in-vehicle camera 214 is used for the vehicle-mounted device 20 to detect that the user 4 has got on the vehicle 2 or got off the vehicle 2 and is used to determine whether the portable terminal 40 of the user 4 has been left behind in the vehicle or not. A plurality of the in-vehicle cameras 214 may be disposed in the vehicle. The in-vehicle camera 214 is disposed on a front side ceiling or the like of the vehicle 2 such that the user 4 in the vehicle is clearly imaged, for example.

The display device 215 is controlled by the vehicle-mounted device 20 and displays various messages with respect to the user 4 of the vehicle 2.

The out-of-vehicle speaker 216 is controlled by the vehicle-mounted device 20 and performs various announcements with respect to the outside of the vehicle by using a voice.

The map database 217 is a database related to map information. The map database 217 is stored in a hard disk drive (HDD) installed in the vehicle 2, for example. The map information includes information about the positions of roads, information about the shapes of roads (for example, type of curve and linear portion, curvature of curve, or like), information about the positions of intersections and junctions, and information about the types or roads, or the like.

The navigation device 218 creates a traveling route up to a destination based on the current position of the vehicle 2 measured by the position measurement sensor 213 and the destination of the user 4 of the vehicle 2 while referring to the map information of the map database 217 and outputs the traveling route.

Referring again to FIG. 1, the server 30 includes a communication interface (hereinafter, referred to as communication I/F) 301, a storage unit 302, and a controller 303 which are connected to each other via a signal line.

The communication I/F 301 is an example of a communication unit and is a communication I/F circuit used to connect the server 30 to the network 5 via a gateway or the like, for example. The communication I/F 301 is configured to be able to communicate with the vehicle-mounted device 20 (more specifically, out-of-vehicle communication machine 204) of the vehicle 2 and the portable terminal 40 via the network 5.

The storage unit 302 includes a storage medium such as a hard disk drive (HDD), an optical recording medium, and a semiconductor memory and stores a computer program executed in the controller 303. In addition, the storage unit 302 stores data generated by the controller 303 and data that the controller 303 receives via the network 5. In addition, the storage unit 302 stores, as an example of information related to the user 4, information such as identification information of the user 4, the address of the user 4, and a predetermined transmission destination (article-left-behind contact address) to which article-left-behind notification is transmitted when the portable terminal 40 is left behind.

The controller 303 may be one or more processors executing a computer program for control and calculation performed in the server 30 and a circuit in the vicinity of the one or more processors.

When a vehicle allocation request is received from the portable terminal 40 or the like via the communication I/F 301, the controller 303 transmits a vehicle allocation instruction to the vehicle-mounted device 20 of the vehicle 2 via the communication I/F 301. When the vehicle-mounted device 20 receives the vehicle allocation instruction via the out-of-vehicle communication machine 204, the vehicle-mounted device 20 causes the vehicle control unit 21 to autonomously drive the vehicle 2 such that the vehicle 2 moves to the destination of the user 4 after the vehicle 2 moves to the current location of the user 4 and the user 4 gets on the vehicle.

There is a case where the user 4 leaves the portable terminal 40 behind in the vehicle when the user 4 gets off the vehicle 2. If an article left behind in the vehicle is an article other than the portable terminal 40 of the user 4, it is possible to notify the user 4 of the article left behind in the vehicle even after the user 4 gets off the vehicle by performing notification indicating that the portable terminal 40 of the user 4 has been left behind. However, in a case where the article left behind in the vehicle is the portable terminal 40 of the user 4, it is not possible to notify the user 4 of the article left behind in the vehicle even by performing notification indicating that the portable terminal 40 has been left behind. As described above, if it is not possible to notify the user 4 of an article left behind in the vehicle, there is a possibility of a decrease in serviceability of a mobility service. In addition, in a case where the user 4 notices that the portable terminal 40 is not on the user's hand late after use of the mobility service, a place where the user 4 has lost the portable terminal 40 may be unclear.

With regard to this, according to the present embodiment, it is possible to provide a useful mobility service with respect to the portable terminal 40 left behind in a case where the portable terminal 40 is left behind in the vehicle while suppressing the portable terminal 40 being left behind in the vehicle.

Specifically, according to the present embodiment, first, article-left-behind prevention notification can be transmitted to the portable terminal 40 of the user 4 at a random time before the vehicle 2 arrives at the destination of the user 4 (for example, five minutes before expected arrival time) such that the portable terminal 40 is prevented from being left behind.

The article-left-behind prevention notification is notification that is performed to prevent the portable terminal 40 from being left behind by causing the user 4 to recognize the portable terminal 40 of the user 4 through the notification. Therefore, although the article-left-behind prevention notification may include information (reminder information) for directly preventing the portable terminal 40 from being left behind like a message "Please be careful not to leave this portable terminal behind in the vehicle", the reminder information does not need to be included and notification may be performed by using information indicating that the vehicle will arrive at the destination soon like a message "About five minutes to destination" together with the reminder information or instead of the reminder information.

As described above, since it is possible to cause the user 4 to recognize the portable terminal 40 by transmitting the article-left-behind prevention notification to the portable terminal 40 of the user 4 before the vehicle 2 arrives at the destination of the user 4, it is possible to prevent the portable terminal 40 from being left behind.

Next, an announcement notifying the user that the portable terminal 40 has been left behind in the vehicle like an announcement "There is a portable terminal left behind" can be made by the out-of-vehicle speaker 216 when a determination is made that the user 4 has left the portable terminal 40 in the vehicle based on an image captured by the in-vehicle camera 214 when the user 4 gets off the vehicle, for example.

Accordingly, even in a case where the user gets off the vehicle 2 in a hurry, it is possible to effectively notify the user 4 that the portable terminal 40 has been left behind. Therefore, it is possible to prevent the portable terminal 40 from being left behind in the vehicle. Note that, instead of the announcement, a warning sound or the like notifying the user that the portable terminal 40 has been left behind in the vehicle may be output from the out-of-vehicle speaker 216.

Last, in a case where the portable terminal 40 is left behind in the vehicle, article-left-behind notification indicating that the portable terminal 40 has been left behind in the vehicle can be transmitted to a predetermined transmission destination (hereinafter, referred to as article-left-behind contact address) that is registered by the user 4, who is the owner of the portable terminal 40 left behind, in advance.

The article-left-behind contact address is an address in mail software or a messaging application that can be activated on a terminal (for example, cellular phone, tablet computer, desktop computer, or like) other than the portable terminal 40 carried by the user 4, for example. Accordingly, it is possible to view the contents of the article-left-behind notification with a terminal other than the portable terminal 40 carried by the user 4. The article-left-behind contact address may be an address in mail software or a messaging application that can be viewed by the user 4 on a terminal other than the portable terminal 40 and may be an address in mail software or a messaging application that can be viewed on a terminal of a person related to the user 4 such as a family of the user 4.

The article-left-behind notification can include contact information for an article left behind, information about a date and time when the portable terminal 40 has been left in the vehicle and a place where the portable terminal 40 has been left in the vehicle, vehicle identification information for specifying the vehicle 2 in which the portable terminal 40 has been left behind, and the like in addition to information notifying the user 4 that the portable terminal 40 has been left in the vehicle like a message "Have not you leave the portable terminal 40 behind in the vehicle when using the mobility service?". The vehicle identification information is the type of the vehicle 2 or the vehicle number thereof, for example.

In addition, in a case where a delivery service for an article left behind is performed as part of the mobility service, the article-left-behind notification may include inquiry information about whether the user 4 wants delivery of the portable terminal 40 to a predetermined delivery destination (desired delivery destination) or not, the predetermined delivery destination being registered by the user 4, who is the owner of the portable terminal 40 left behind, in advance.

As described above, in a case where the portable terminal 40 of the user 4 is left behind in the vehicle, it is possible to notify the user 4 that there is an article left behind in the vehicle by transmitting the article-left-behind notification to the article-left-behind contact address of the user 4. In addition, when the user 4 notices that the portable terminal 40 is not on the user's hand after use of the mobility service, the user 4 can confirm whether the portable terminal 40 has been left behind in the vehicle or not by confirming the article-left-behind notification via a terminal other than the portable terminal 40. Therefore, it is possible to achieve an improvement in serviceability of a mobility service.

Figure 3:
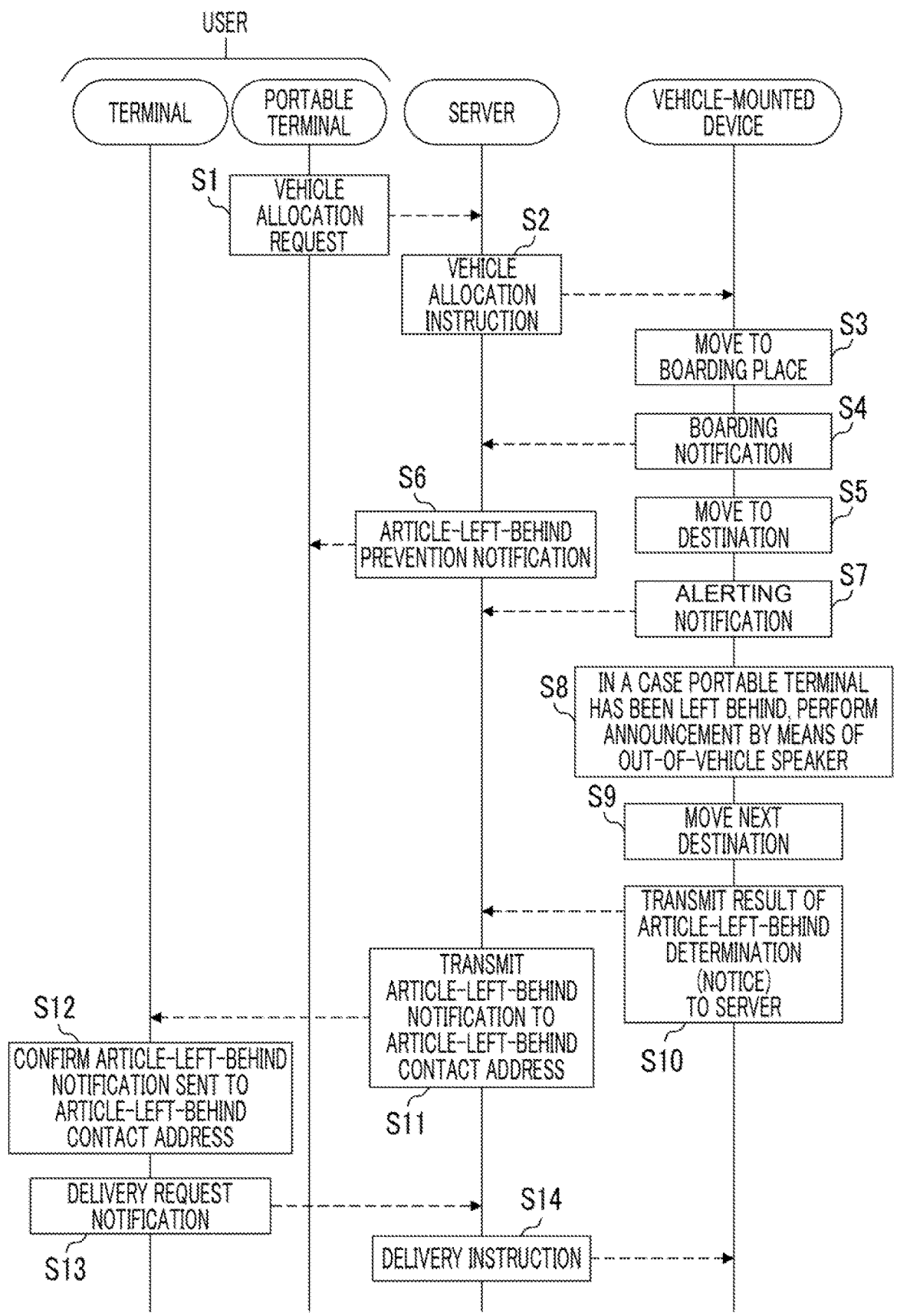
FIG. 3 is a sequence diagram illustrating an example of a mobility service supporting process according to the embodiment of the disclosure.

FIG. 3 is a sequence diagram illustrating an example of a mobility service supporting process according to the present embodiment. In the sequence diagram shown in FIG. 3, communication between the server 30, the vehicle-mounted device 20 of the vehicle 2, and the portable terminal 40 is performed via the network 5.

Note that, in the following description, the user 4 who is the target of the mobility service according to the present embodiment will be referred to as a "user 4a" and the user 4 other than the target of the mobility service will be referred to as a "user 4b", for the sake of convenience.

In step S1, the user 4a operates the portable terminal 40 carried by the user 4a such that a vehicle allocation request is transmitted to the server 30. The vehicle allocation request includes identification information of the user 4a and information about the current location, the destination, and the like of the user 4a in addition to a request for allocation of a vehicle. The identification information of the user 4a is, for example, a user number given to the user 4a who uses the mobility service. In addition, the current location and the destination of the user 4a are designated by means of a combination of a facility name, an address, a longitude, and a latitude, for example.

In step S2, the server 30 which has received the vehicle allocation request searches for the vehicle 2 present within a certain distance from the current location of the user 4a, selects the vehicle 2 that is available from at least one searched vehicle 2, and transmits a vehicle allocation instruction to the vehicle-mounted device 20 of the selected vehicle 2 such that the vehicle 2 moves to the current location of the user 4a. The vehicle allocation instruction includes the identification information of the user 4a and the information about the current location, the destination, and the like of the user 4a which are included in the vehicle allocation request.

In step S3, the vehicle-mounted device 20 which has received the vehicle allocation instruction causes the vehicle control unit 21 to autonomously drive the vehicle 2 such that the vehicle 2 moves to the current location of the user 4a (or boarding place designated by user 4a).

In step S4, the vehicle-mounted device 20 of the vehicle 2 moved to the current location of the user 4a allows the user 4a to get on the vehicle by unlocking a door lock after confirming (matching) that the vehicle allocation request is from the user 4a by means of short-range wireless communication between the vehicle-mounted device 20 and the portable terminal 40 of the user 4a, for example. Then, the vehicle-mounted device 20 transmits boarding notification to the server 30 after confirming that the user 4a has got on the vehicle by means of a door opening and closing operation or the in-vehicle camera 214, for example.

In step S5, the vehicle-mounted device 20 causes the navigation device 218 installed in the vehicle 2 to create a traveling route based on information about the current location of the vehicle 2, the destination of the user 4a which is included in the vehicle allocation instruction (furthermore, destination of other user 4b in a case where vehicle 2 provides ridesharing service or like and user 4b has already got on vehicle 2), and the like. Then, the vehicle-mounted device 20 instructs the vehicle control unit 21 to perform autonomous driving in accordance with the created traveling route such that the vehicle 2 moves to the destination. Note that, the vehicle-mounted device 20 periodically transmits position information indicating the current location of the vehicle 2 to the server 30 while the vehicle 2 is being autonomously driven by the vehicle control unit 21.

In step S6, when the server 30 detects that the vehicle 2 has moved to a position close to the destination of the user 4a based on the current location of the vehicle 2 and the destination of the user 4a received by the server 30, the server 30 transmits the article-left-behind prevention notification to the portable terminal 40 of the user 4a before the vehicle 2 arrives at the destination of the user 4a such that the user 4a is prevented from leaving the portable terminal 40 behind in the vehicle 2.

In the present embodiment, the server 30 calculates a time that will be taken for the vehicle 2 to arrive at the destination of the user 4a (hereinafter, referred to as "expected time taken to arrive at destination") based on the current position information of the vehicle 2 and destination information of the user 4a received by the server 30 and when the expected time taken to arrive at the destination is shorter than a predetermined time (for example, five minutes), the server 30 transmits the article-left-behind prevention notification to the portable terminal 40 of the user 4a.

In step S7, the vehicle-mounted device 20 of the vehicle 2 moved to the destination of the user 4a transmits alerting notification to the server 30 after confirming that the user 4a has got off the vehicle by means of the door opening and closing operation or the in-vehicle camera 214.

Figure 4:
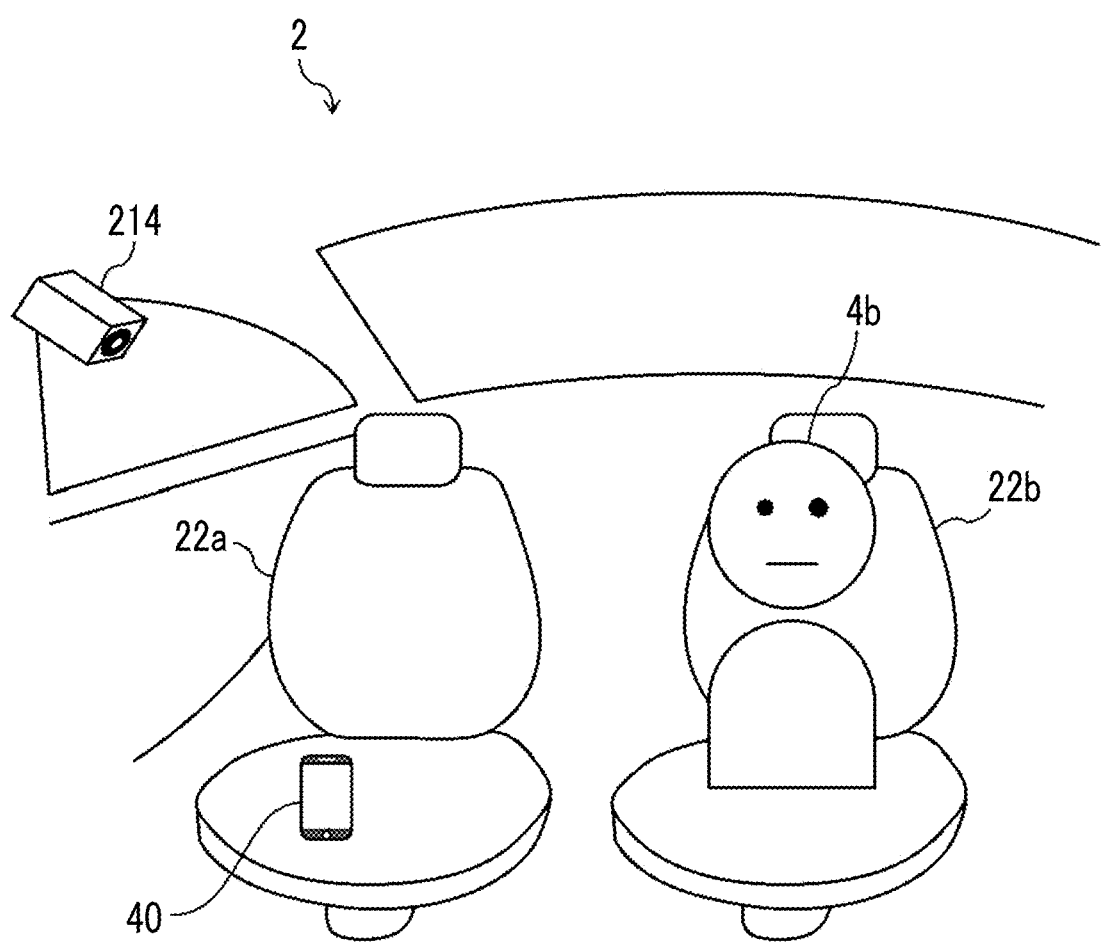
FIG. 4 is a diagram illustrating an example of the state of the inside of the vehicle according to the embodiment of the disclosure.

In step S8, as shown in FIG. 4, the vehicle-mounted device 20 determines whether the portable terminal 40 has been left behind in the vicinity of a seat 22a of the user 4a who has got off the vehicle based on an image captured by the in-vehicle camera 214, for example. In a case where the vehicle-mounted device 20 determines that the portable terminal 40 has been left behind, the vehicle-mounted device 20 performs an announcement notifying the user that the portable terminal 40 has been left behind in the vehicle like an announcement "There is a portable terminal left behind" by means of the out-of-vehicle speaker 216.

Note that, the determination on whether the portable terminal 40 has been left behind in the vicinity of the seat 22a of the user 4a who has got off the vehicle or not can be performed based on an image captured by the in-vehicle camera 214 while the user 4a is getting off the vehicle or immediately after the user 4a gets off the vehicle, for example.

Specifically, the vehicle-mounted device 20 can determine whether the portable terminal 40 has been left behind or not by detecting the portable terminal 40 in the image by using a machine learning technique. For example, the vehicle-mounted device 20 can use a detector based on a deep neural network (DNN) or the like that is caused to learn to detect the portable terminal 40 from an image when the image is input and when an image that is captured by the in-vehicle camera 214 while the user 4a is getting off the vehicle or immediately after the user 4a gets off the vehicle is input to the detector and the portable terminal 40 is detected, the vehicle-mounted device 20 can determine that the portable terminal 40 has been left behind in the vicinity of the seat 22a of the user 4a who has got off the vehicle.

In step S9, when the vehicle-mounted device 20 recognizes that the user 4a who has got off the vehicle is separated from the vehicle 2 by a distance equal to or greater than a certain distance based on a signal output from the out-of-vehicle camera 211 or the distance measurement sensor 212, the vehicle-mounted device 20 causes the vehicle control unit 21 to autonomously drive the vehicle 2 toward the next destination (that is, destination of other user 4b who has already got on vehicle 2 or current location of other user 4b from whom new vehicle allocation request is received) after performing needed safety confirmation about whether the doors of the vehicle are closed or the like.

In step S10, the vehicle-mounted device 20 determines whether the portable terminal 40 has been left behind in the vicinity of the seat 22a of the user 4a who has got off the vehicle based on an image captured by the in-vehicle camera 214 again and transmits the result of the article-left-behind determination to the server 30. The result of the article-left-behind determination includes the result of determination on whether the portable terminal 40 has been left behind and includes identification information of the user 4a who is the owner of the portable terminal 40 in a case where there is the portable terminal 40 left behind.

Note that, for example, when the portable terminal 40 left behind is detected in a case where a plurality of the users 4 gets off the vehicle 2 at the same time, it may not be possible to recognize which user 4 is the owner of the portable terminal 40 left behind. Therefore, in a case where it is not possible to completely specify the owner of the portable terminal 40 left behind, that is, in a case where there is a plurality of the users 4 who is considered the owner of the portable terminal 40 left behind, identification information of each of the users 4 may be included in notification of the result of the article-left-behind determination.

In step S11, the server 30 which has received the result of the article-left-behind determination of the portable terminal 40 specifies, based on the identification information of the user 4a who has left the portable terminal 40 behind, an article-left-behind contact address that is registered by the user 4a in advance and transmits the article-left-behind notification to the article-left-behind contact address in a case where the result of the article-left-behind determination is that the portable terminal 40 has been left behind, that is, in a case where contact notification indicating that the portable terminal 40 has been left behind in the vehicle is received, the identification information being included in the result of the article-left-behind determination. In a case where the identification information of the users 4 who have possibly left the portable terminal 40 behind is included in the result of the article-left-behind determination, the server 30 transmits the article-left-behind notification to the article-left-behind contact address of each user 4.

Note that, when notification indicating that the portable terminal 40 has been left in the vehicle is received in a case where there is the other user 4b getting on the vehicle 2, the server 30 may transmit an instruction to the vehicle-mounted device 20 such that a message asking the user 4b to put the portable terminal 40 left behind into an article-left-behind box disposed in the vehicle 2 is displayed on the display device 215 installed in the vehicle 2, for example. In addition, in a case where there is no other user 4b in the vehicle 2 and there is no new vehicle allocation request received, the server 30 may transmit an instruction to the vehicle-mounted device 20 such that the vehicle 2 moves to an article-left-behind management center and the portable terminal 40 is stored in the article-left-behind management center where articles left behind are stored and managed, for example.

Note that, as described above, the article-left-behind contact address is an address in mail software or a messaging application that can be activated on a terminal (for example, cellular phone, tablet computer, desktop computer, or like) other than the portable terminal 40.

Accordingly, in step S12, the user 4a who has noticed that the portable terminal 40 has been left behind in the vehicle after the user 4a gets off the vehicle can confirm whether there is article-left-behind notification received or not by activating the mail software or the messaging application on the terminal other than the portable terminal 40.

At this time, in a case where the delivery service for an article left behind is performed as part of the mobility service and the article-left-behind notification includes the inquiry information about whether the user 4 wants delivery of the portable terminal 40 left behind in the vehicle to the predetermined delivery destination (desired delivery destination) such as the house of the user 4 or not, for example, the user 4*a* can transmit delivery request notification requesting delivery of the article left behind to a delivery request notification transmission destination (for example, server 30) included in the article-left-behind notification by using the terminal, via which the user 4*a* confirms the article-left-behind notification, in step S13.

Then, in step S14, the server 30 which has received the delivery request notification transmits, to the vehicle-mounted device 20 or the article-left-behind management center, a delivery instruction for delivery of the portable terminal 40 to the delivery destination of the user 4*a* in accordance with the storage condition of the portable terminal 40 such as whether the portable terminal 40 is still in the vehicle or whether the portable terminal 40 is already stored in the article-left-behind management center. Specifically, in a case where the portable terminal 40 is still in the vehicle, the delivery instruction is issued to the vehicle-mounted device 20 such that the vehicle 2 is moved to the delivery destination as shown in FIG. 3.

Meanwhile, in a case where the portable terminal 40 is already stored in the article-left-behind management center, the delivery instruction for delivery of the stored portable terminal 40 to the delivery destination is transmitted to the article-left-behind management center. In this case, in the article-left-behind management center, a process for delivery of the stored portable terminal 40 to a desired delivery destination is performed.

Figure 5:
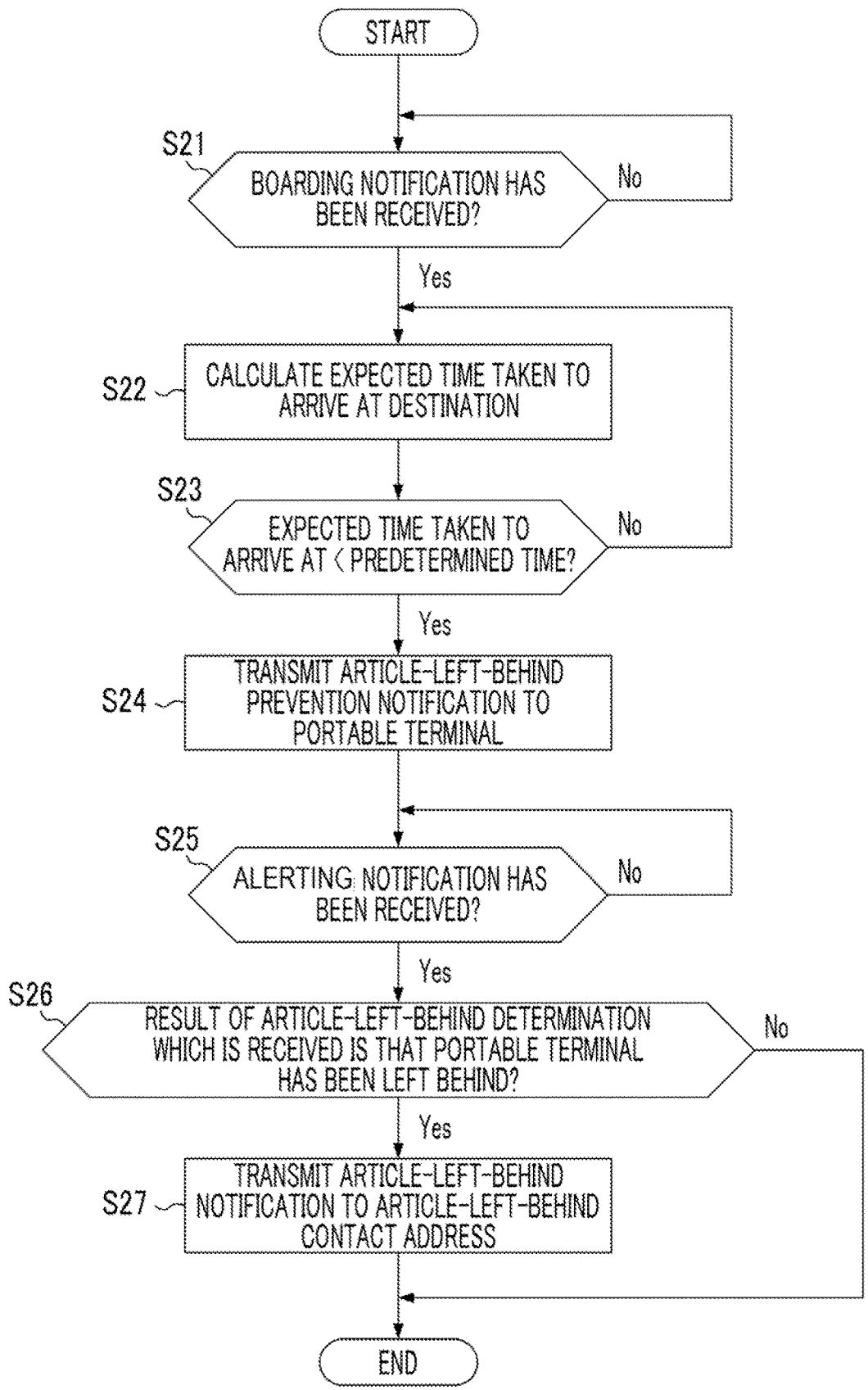
FIG. 5 is a flowchart for describing a part of a process performed in a server that is related to the mobility service supporting process according to the embodiment of the disclosure.

FIG. 5 is a flowchart for describing a part of a process performed in the server 30 (more specifically, controller 303 of server 30) that is related to the mobility service supporting process according to the present embodiment. The server 30 performs the present routine when the server 30 receives a vehicle allocation request for the vehicle 2 from the portable terminal 40 of the user 4*a*, specifies the vehicle 2 that can be allocated after the reception of the vehicle allocation request, and transmits a vehicle allocation instruction to the vehicle-mounted device 20 of the vehicle 2.

In step S21, the server 30 proceeds to a process in step S22 in a case where the boarding notification has already been received from the vehicle-mounted device 20 via the communication I/F 301. Meanwhile, the server 30 performs a process in step S21 again after at a certain interval of time in a case where the boarding notification has not been received from the vehicle-mounted device 20 via the communication I/F 301.

In step S22, the server 30 calculates a time (expected time taken to arrive at destination) that will be taken for the vehicle 2 to arrive at the destination of the user 4*a* based on the current position information of the vehicle 2 which is periodically received from the vehicle-mounted device 20 via the communication I/F 301 and destination information of the user 4*a* which is included in the vehicle allocation request.

In step S23, in a case where the expected time taken to arrive at destination is shorter than the predetermined time (for example, five minutes), the server 30 proceeds to a process in step S24. Meanwhile, in a case where the expected time taken to arrive at destination is not shorter than the predetermined time (for example, five minutes), the server 30 returns to the process in step S22 at a certain interval of time.

In step S24, the server 30 transmits the article-left-behind prevention notification to the portable terminal 40 of the user 4*a* via the communication I/F 301.

In step S25, the server 30 proceeds to a process in step S26 in a case where the alerting notification has already been received from the vehicle-mounted device 20 via the communication I/F 301. Meanwhile, the server 30 performs a process in step S25 again after at a certain interval of time in a case where the alerting notification has not been received from the vehicle-mounted device 20 via the communication I/F 301.

In step S26, the server 30 proceeds to a process in step S27 in a case where the result of the article-left-behind determination which is received from the vehicle-mounted device 20 via the communication I/F 301 is that the portable terminal 40 of the user 4*a* has been left behind. Meanwhile, the server 30 terminates a current process in a case where the result of the article-left-behind determination which is received from the vehicle-mounted device 20 via the communication I/F 301 is that the portable terminal 40 of the user 4*a* has not been left behind.

In step S27, the server 30 transmits the article-left-behind notification to the article-left-behind contact address of the user 4*a* via the communication I/F 301.

Figure 6:
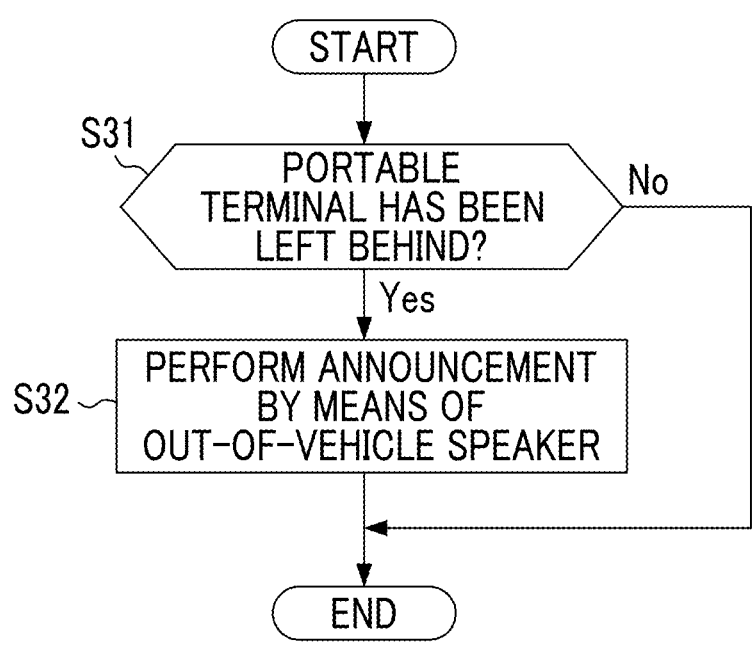
FIG. 6 is a flowchart for describing a part of a process performed in a vehicle-mounted device that is related to the mobility service supporting process according to the embodiment of the disclosure.

FIG. 6 is a flowchart for describing a part of a process performed in the vehicle-mounted device 20 (more specifically, controller 203 of vehicle-mounted device 20) that is related to the mobility service supporting process according to the present embodiment. The vehicle-mounted device 20 performs the present routine when the vehicle arrives at the destination of the user 4*a* and the vehicle-mounted device 20 confirms that the user 4*a* has got off the vehicle by means of a door opening and closing operation or the in-vehicle camera 214.

In step S31, determination on whether the portable terminal 40 has been left behind in the vicinity of a seat of the user 4*a* who has got off the vehicle is made based on an image captured by the in-vehicle camera 214. The vehicle-mounted device 20 proceeds to a process in step S32 when a determination is made that the portable terminal 40 has been left behind. Meanwhile, the vehicle-mounted device 20 terminates a current process when a determination is made that the portable terminal 40 has not been left behind.

In step S32, the vehicle-mounted device 20 performs an announcement notifying a user that the portable terminal 40 has been left behind in the vehicle like an announcement "There is a portable terminal left behind" by means of the out-of-vehicle speaker 216.

The server (mobility service supporting device) 30 according to the present embodiment described above includes the communication I/F 301 (communication unit) configured to be communicable with the vehicle-mounted device 20 installed in the vehicle 2 subjected to autonomous driving control and the portable terminal 40 of the user 4*a* of the vehicle 2 and the controller 303 configured to transmit, based on information about the position of the vehicle 2 which is received from the vehicle-mounted device 20 via the communication I/F 301, the article-left-behind prevention notification (notification) for preventing the portable terminal 40 from being left behind in the vehicle to the portable terminal 40 of the user 4*a* via the communication I/F 301 before the vehicle 2 arrives at the destination of the user 4*a*.

As described above, since it is possible to cause the user 4a to recognize the portable terminal 40 by transmitting the article-left-behind prevention notification to the portable terminal 40 of the user 4a before the vehicle 2 arrives at the destination of the user 4a, it is possible to prevent the portable terminal 40 from being left behind. That is, it is possible to suppress the portable terminal 40 being left behind in the vehicle.

In addition, according to the present embodiment, the controller 303 of the server 30 is configured to transmit, via the communication I/F 301, the article-left-behind notification including information notifying the user that the portable terminal 40 has been left behind in the vehicle to the predetermined transmission destination (article-left-behind contact address) when the result of the article-left-behind determination including the result of determination indicating that the portable terminal 40 has been left behind in the vehicle (that is, contact notification indicating that portable terminal 40 has been left in vehicle) is received from the vehicle-mounted device 20 via the communication I/F 301, the predetermined transmission destination being registered by the user 4a, who has left the portable terminal 40 behind, in advance. The predetermined transmission destination is an address in mail software or a messaging application that can be activated on a terminal other than the portable terminal 40 left behind in the vehicle, for example.

Accordingly, even in a case where the user 4a leaves the portable terminal 40 behind in the vehicle, it is possible to notify the user 4 that the portable terminal 40 has been left behind in the vehicle. In addition, when the user 4a notices that the portable terminal 40 is not on the user's hand after use of the mobility service, the user 4a can confirm whether the portable terminal 40 has been left behind in the vehicle or not by confirming the article-left-behind notification via a terminal other than the portable terminal 40. Therefore, it is possible to achieve an improvement in serviceability of a mobility service.

Note that, the contact notification may include information about at least one user 4 who has possibly left the portable terminal 40 behind in the vehicle and in this case, the controller 303 of the server 30 may transmit the article-left-behind notification to every user 4 included in the contact notification.

Accordingly, even in a case where it is not possible to specify the user 4a who has left the portable terminal 40 behind in the vehicle, it is possible to transmit the article-left-behind notification to all of the users 4 who have possibly left the portable terminal behind and thus it is possible to reliably transmit the article-left-behind notification to the user 4a who has left the portable terminal 40 behind.

In addition, the article-left-behind notification may include vehicle identification information for specifying the vehicle 2 in which the portable terminal 40 has been left behind and inquiry information about whether the user 4a wants delivery of the portable terminal 40 to a predetermined delivery destination or not, the predetermined delivery destination being registered by the user 4a, who has left the portable terminal 40 behind in the vehicle, in advance. Therefore, it is possible to achieve a further improvement in serviceability of a mobility service.

In addition, according to the present embodiment, the communication I/F 301 (communication unit) of the server 30 is configured to be communicable with a terminal other than the portable terminal 40 left behind in the vehicle and the controller 303 of the server 30 is configured to transmit, to the vehicle-mounted device 20 via the communication I/F 301, an instruction for delivery of the portable terminal 40 left behind in the vehicle to the delivery destination when delivery request notification requesting delivery of the portable terminal 40 to the delivery destination is received via the terminal.

In addition, according to a modification example of the present embodiment, the communication I/F 301 (communication unit) of the server 30 is configured to be communicable with a terminal other than the portable terminal 40 left behind in the vehicle and an article-left-behind management center in which an article left behind in the vehicle is managed and the controller 303 of the server 30 is configured to transmit, to the article-left-behind management center via the communication I/F 301, an instruction for delivery of the portable terminal 40 left behind in the vehicle to the delivery destination when delivery request notification requesting delivery of the portable terminal 40 to the delivery destination is received via the terminal.

Accordingly, the user 4a who has left the portable terminal 40 behind does not need to go to pick up the portable terminal 40 and thus it is possible to achieve a further improvement in serviceability of a mobility service.

In addition, according to the present embodiment, the vehicle-mounted device 20 is configured to perform an announcement or warning indicating that the portable terminal 40 has been left behind by means of the out-of-vehicle speaker 216 installed in the vehicle 2 in a case where the portable terminal 40 of the user 4a that has been left behind in the vehicle is detected when the vehicle 2 arrives at the destination of the user 4a and the user 4a gets off the vehicle.

Accordingly, even in a case where the user gets off the vehicle in a hurry, it is possible to effectively notify the user 4 that the portable terminal 40 has been left behind. Therefore, it is possible to further prevent the portable terminal 40 from being left behind in the vehicle.

Hereinabove, the embodiment of the disclosure has been described. However, the embodiment is merely a portion of application examples of the disclosure and the technical scope of the disclosure is not limited to the specific configurations of the above embodiment.

What is claimed is:

1. A mobility service supporting device comprising:
   a communication unit configured to be communicable with a vehicle-mounted device installed in an autonomous driving control vehicle and with a portable terminal of a user of the vehicle; and
   at least one in-vehicle camera for detecting the portable terminal: and
   a controller configured to
   transmit, based on arrival information that is determined from an expected time of arrival for a destination of the user determined from information about a current position of the vehicle which is received from the vehicle-mounted device via the communication unit, a preventative notification to the portable terminal of the user via the communication unit before arrival of the vehicle at the destination of the user for preventing the portable terminal from being left behind in the vehicle before the vehicle arrives at the destination of the user, said controller configured to transmit the preventative notification to the portable terminal independent of detection of the portable terminal, said controller also configured to transmit based upon the arrival information, based on the at least one in-vehicle camera detecting that the portable terminal has been left behind in the vehicle, an article-left-behind notification notifying the user that the portable terminal has been left behind in the vehicle after arrival of the vehicle at the destination of the user, to a predetermined terminal that is different from the portable terminal.

2. The mobility service supporting device according to claim 1, wherein the controller transmits, via the communication unit to a predetermined transmission destination, an article-left-behind notification including information notifying the user that the portable terminal has been left behind in the vehicle when a contact notification indicating that the portable terminal has been left behind in the vehicle is received from the vehicle-mounted device via the communication unit, the predetermined transmission destination being registered in advance by the user, who has left the portable terminal behind.

3. The mobility service supporting device according to claim 2, wherein the predetermined transmission destination is an address in mail software or a messaging application that is activated on a terminal other than the portable terminal left behind in the vehicle.

4. The mobility service supporting device according to claim 2, wherein:
the contact notification includes information about at least one user who has possibly left the portable terminal behind in the vehicle; and
the controller transmits the article-left-behind notification to every user included in the contact notification.

5. The mobility service supporting device according to claim 2, wherein the article-left-behind notification includes vehicle identification information for specifying the vehicle in which the portable terminal has been left behind.

6. The mobility service supporting device according to claim 2, wherein the article-left-behind notification includes inquiry information about whether the user wants delivery of the portable terminal to a predetermined delivery destination, the predetermined delivery destination being registered in advance by the user, who has left the portable terminal behind in the vehicle.

7. The mobility service supporting device according to claim 6, wherein:
the communication unit is configured to be communicable with a terminal other than the portable terminal; and
the controller transmits, to the vehicle-mounted device via the communication unit, an instruction for delivery of the portable terminal left behind in the vehicle to the delivery destination when a delivery request notification requesting delivery of the portable terminal to the delivery destination is received via the terminal.

8. The mobility service supporting device according to claim 6, wherein:
the communication unit is configured to be communicable with a terminal other than the portable terminal and with an article-left-behind management center in which an article left behind in the vehicle is managed; and
the controller transmits, to the article-left-behind management center via the communication unit, an instruction for delivery of the portable terminal left behind in the vehicle to the delivery destination when delivery request notification requesting delivery of the portable terminal to the delivery destination is received via the terminal.

9. A mobility service supporting device according to claim 1, wherein the controller is further configured to calculate an expected time the vehicle arrives at the destination, and to transmit the preventative notification to the user's portable terminal a predetermined time before the calculated expected time of arrival.

10. A mobility system comprising:
a vehicle-mounted device installed in an autonomous driving control vehicle;
a server connected to be communicable with the vehicle-mounted device and with a portable terminal of a user of the vehicle via a network, and
at least one in-vehicle camera for detecting the portable terminal; wherein:
the vehicle-mounted device transmits information about a current position of the vehicle to the server; and
the server transmits, based on arrival information that is determined from an expected time of arrival for a destination of the user determined from the information about the current position of the vehicle which is received from the vehicle-mounted device, a preventative notification for preventing the portable terminal from being left behind in the vehicle to the portable terminal of the user before the vehicle arrives at the destination of the user, the server configured to transmit the preventative notification to the portable terminal and independent of detection of the portable terminal, said server also configured to transmit, based on the arrival information, based on the at least one in-vehicle camera detecting that the portable terminal has been left behind in the vehicle, an article-left-behind notification notifying the user that the portable terminal has been left behind in the vehicle after arrival of the vehicle at the destination of the user to a predetermined terminal that is different from the portable terminal.

11. The mobility system according to claim 10, wherein the vehicle-mounted device performs an announcement or warning indicating that the portable terminal has been left behind by means of an out-of-vehicle speaker installed on the vehicle when the portable terminal of the user that has been left behind in the vehicle is detected and the vehicle arrives at the destination of the user and the user leaves the vehicle.

12. The mobility system according to claim 9, wherein the server calculates an expected time the vehicle arrives at the destination, and transmits the preventative notification to the user's portable terminal a predetermined time before the calculated expected time of arrival.

13. A mobility service supporting method comprising:
transmitting, based on arrival information that is determined from an expected time of arrival for a destination of a user that is determined from information about a current position of an autonomous driving control vehicle which is received from a vehicle-mounted device installed in the vehicle via a communication unit configured to be communicable with the vehicle-mounted device and with a portable terminal of a user of the vehicle, and with at least one in-vehicle camera for detecting the portable terminal, a preventative notification to the portable terminal of the user via the communication unit for preventing the portable terminal from being left behind in the vehicle before the vehicle arrives at a destination of the user, the preventative notification being transmitted to the portable terminal independent of detection of the portable terminal, and
transmitting, based on the arrival information, based on the at least one in-vehicle camera detecting that the portable terminal has been left behind in the vehicle, an article-left-behind notification notifying the user that the portable terminal has been left behind in the vehicle after arrival of the vehicle at the destination of the user to a predetermined terminal that is different from the portable terminal.

14. The mobility service supporting method according to claim 13, further comprising calculating an expected time the vehicle arrives at the destination, and transmitting the preventative notification to the user's portable terminal a predetermined time before the calculated expected time of arrival.

15. A non-transitory computer readable medium for supporting a mobility service, the medium causing a computer to transmit, based on arrival information that is determined from an expected time of arrival for a destination of a user determined from information about a current position of an autonomous driving control vehicle which is received from a vehicle-mounted device installed in the vehicle via a communication unit configured to be communicable with the vehicle-mounted device and with a portable terminal of a user of the vehicle, and with at least one in-vehicle camera for detecting the portable terminal, a preventative notification to the portable terminal of the user via the communication unit for preventing the portable terminal from being left behind in the vehicle before arrival of the vehicle at the destination of the user, said computer readable medium causing the computer to transmit the preventative notification to the portable terminal of the user independent of detection of the portable terminal, said computer readable medium configured to cause the computer to transmit, based on the arrival information, based on the at least one in-vehicle camera detecting that the portable terminal has been left behind in the vehicle, an article-left-behind notification notifying the user that the portable terminal has been left behind in the vehicle after arrival of the vehicle at the destination of the user to a predetermined terminal that is different from the portable terminal.

16. The non-transitory computer readable medium according to for supporting a mobility service according to claim 15, wherein the medium further causes the computer to calculate an expected time the vehicle arrives at the destination, and to transmit the preventative notification to the user's portable terminal a predetermined time before the calculated expected time of arrival.

* * * * *